US006164625A

United States Patent [19]

Shockley et al.

[11] Patent Number: 6,164,625

[45] Date of Patent: Dec. 26, 2000

[54] COMPACTLY STORABLE, MOBILE ENGINE HOIST

[76] Inventors: Troy E. Shockley, 105 Trails End, Greenville, S.C. 29607; James D. Shockley, 1735 E. Saluda Lake Dr., Greenville, S.C. 29611

[21] Appl. No.: 09/295,462

[22] Filed: Apr. 20, 1999

[51] Int. Cl.[7] ..................... B60P 1/48

[52] U.S. Cl. ..................... 254/8 B

[58] Field of Search ..................... 254/2 B, 2 R, 254/8 B, 8 R, 124

[56] References Cited

U.S. PATENT DOCUMENTS

| | | | |
|---|---|---|---|
| 2,669,424 | 2/1954 | Branick | 254/2 B |
| 2,909,358 | 10/1959 | Southerwick | 254/2 B |
| 3,931,956 | 1/1976 | Hawkins | 254/8 B |
| 4,334,668 | 6/1982 | Caris | 254/8 B |
| 5,076,448 | 12/1991 | Ballard | 254/8 B |
| 5,188,247 | 2/1993 | Jastrow . | |
| 5,261,640 | 11/1993 | Yuan . | |
| 5,261,641 | 11/1993 | Ployer | 254/8 B |
| 5,375,963 | 12/1994 | Wohlwend . | |
| 5,897,101 | 4/1999 | Snyder | 254/8 B |
| 5,992,824 | 11/1999 | Voss | 254/8 B |

*Primary Examiner*—Robert C. Watson
*Attorney, Agent, or Firm*—Cort Flint; William D. Lee, Jr.

[57] ABSTRACT

A portable engine hoist which folds into a compact storage position. The base of the hoist is equipped with two support wheels. Two elongated legs extend from the base and are adapted to receive leg extensions. The leg extensions are provided with wheels at one end and the other end can be inserted into a leg. An upright post extends from a base support and carries a pivotally mounted lifting beam at its top end. A mechanical or hydraulic jack operates to raise and lower the lifting beam to raise and lower an engine. Position adjustment and maintenance means for easy assembly of the leg extensions are provided. A cam slot locking means associated with the lifting beam provides stability under the load.

17 Claims, 6 Drawing Sheets

Fig. 46
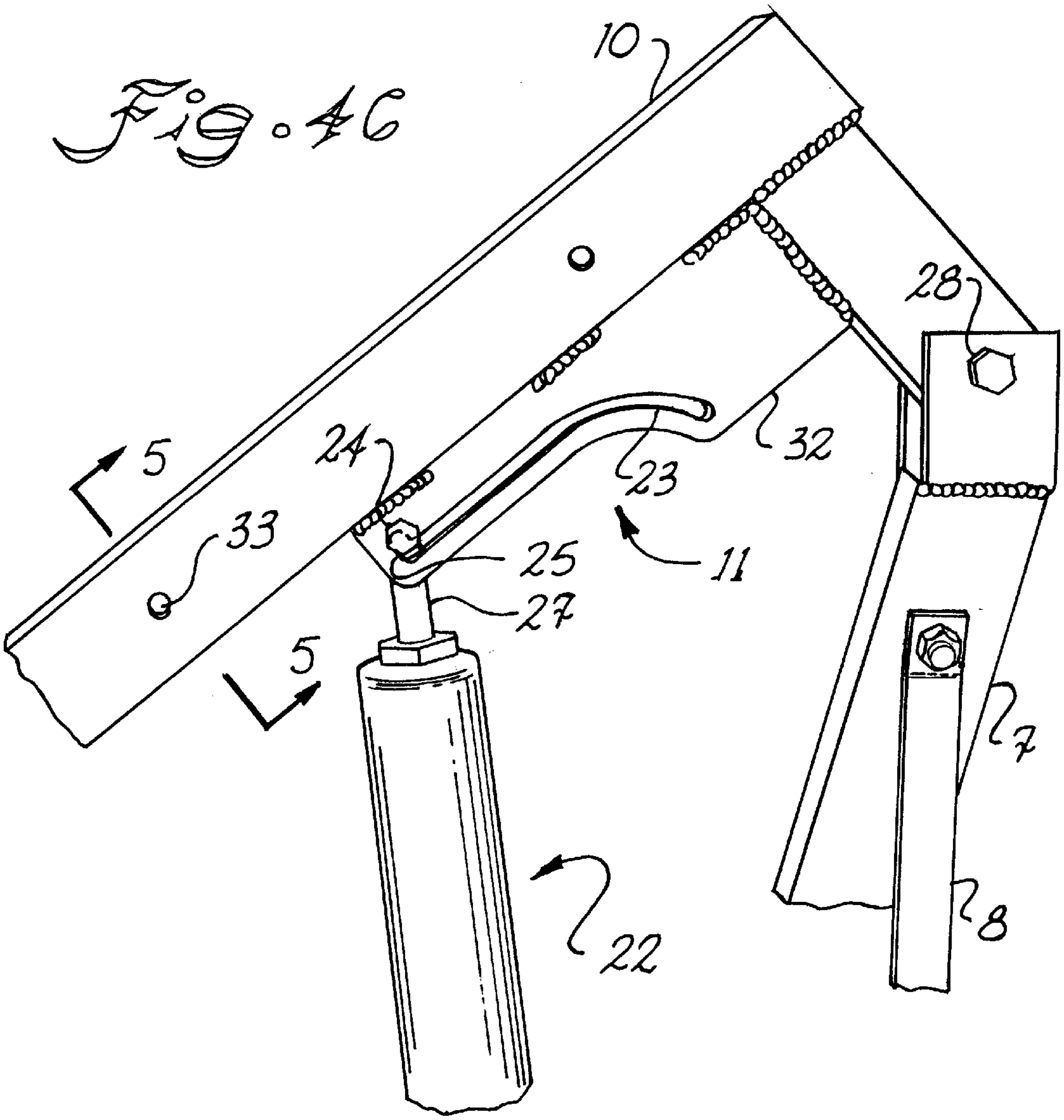
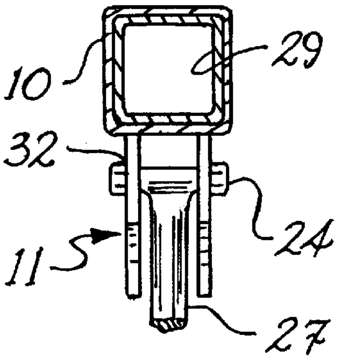
Fig. 5

COMPACTLY STORABLE, MOBILE ENGINE HOIST

FIELD OF THE INVENTION

This invention relates generally to an engine hoist and more particularly to a foldable engine hoist which may be rolled along a floor to a desired work station while in the folded, compact storage position. More specifically, this invention relates to improvements in preparing and stabilizing a folded hoist for use at a work station.

BACKGROUND OF THE INVENTION

In the servicing and repair of motor vehicles, it is often necessary to remove and replace the engine. Although various types of hoist mechanisms have been developed for lifting an engine from the chassis or engine compartment, they have not been altogether satisfactory. Typically, engine hoists take the form of large, heavy duty equipment which is complicated and expensive. In addition, the engine hoist occupies a considerable amount of space which is a decided disadvantage in most applications where space is at a premium because of the many other types of equipment required in today's service departments.

Typical prior art compact hoists are described in Northern Hydraulics Catalog #113 (Northern Hydraulics Corp., 2800 Southcross Dr., Burnsville, Minn.) at page 101 (space saver engine hoist) and in U.S. Pat. No. 5,261,640 which issued on Nov. 16, 1993 to Francis Yuan. Other portable lifts and hoists are described in U.S. Pat. No. 5,375,963 (Wohlwend) and U.S. Pat. No. 5,188,247 (Jastrow).

While the hoists in the first two disclosures mentioned above are portable and can be compactly stored to some extent, they are difficult to reassemble for use and may require more than one person for hoist set up. Accordingly, it is one object of the present invention to provide a storable hoist that can be easily assembled and positioned for use by one person.

In prior art hoists of the above mentioned type, which are sometimes also called "space-saver" engine hoists, the hoist consists of a transverse base beam carried by a pair of support wheels with a pair of base legs extending therefrom which are likewise provided with support wheels. Removable base leg extensions are provided and the distal ends of these extensions are also provided with support wheels. The base also carries an upright post and lifting beam. With this arrangement there are three pairs of support wheels, each pair generally axially in a line with the lines parallel to each other. If all wheels are of the same diameter it was discovered that due to play in the leg extension connections the intermediate or middle pair became a principal load bearing pair of wheels or axis of rotation. Under load the rearward or base wheels tend to be lifted off the floor because of the turning moment transmitted through the lifting beam and post. To cure this instability, the middle pair of wheels or leg extension wheels were made with a smaller diameter than the other wheels so that the outermost four wheels were load bearing and the middle pair did not touch the floor. The drawback to this arrangement is that when the hoist is disassembled by removing the leg extensions for storage it is difficult for one person to remove the extensions or to later reconnect them because the hoist tilts forward and rests on the smaller diameter base leg wheels.

Accordingly, it is a principal object of the present invention to provide a stable hoist and a means and method by which one person can easily disassemble, store, and reassemble same.

Another problem encountered in using hydraulically operated prior art portable hoists is that in order to reach the operating position, that is, the extension of the beam to a point above the load being lifted a number of time consuming pump strokes are necessary. Accordingly, it is another object of the present invention to provide a means and method for manually and easily positioning and locking the lifting beam prior to applying hydraulic or mechanical pressure or lifting force.

The foregoing and other problems present in prior art hoists are solved or significantly reduced by the invention described in the summary below.

SUMMARY OF THE INVENTION

The present invention is directed to a portable engine hoist which is uniquely constructed so that it can be easily rolled along a floor or other surface to the proper position for performing its function of removing or replacing an engine. The hoist of the present invention is further characterized by a construction which enables it to assume a compact condition in order to minimize the space it occupies when not being used yet it can be readily assembled for use by one person. Safety is also enhanced by providing a locking means for the lifting beam.

The engine hoist of the invention includes a base having a pair of spaced apart wheels or means thereon for rolling support on a surface; a pair of base legs each spaced apart and connected at one end thereof to said base with the other end being adapted to receive a leg extension; leg extensions with means on each leg for rolling support on a surface in the operating or supporting position of the leg extensions, said rolling means being located adjacent one end of each leg extension and the other end of each extension being adapted for operable and supporting connection to a respective receiving end of one of said base legs; a post support disposed between said legs and connected to either the legs, the base, or both; an upright post extending upwardly from said post support; a pair of braces each having upper and lower ends, said upper end being connected with said post, and said lower ends being connected with said base; means associated with said post for storing said legs when not in operable position; a lifting beam pivotally connected to said post; means for pivoting said beam relative to said post to raise and lower an engine carried on the lifting beam; and, means associated with said post support or base for adjusting the height of the support and legs above said surface to a supporting position whereby when said extensions are moved from a storage position to an operable or supporting position said legs can be adjusted to the correct height to readily receive said extensions.

The hoist has a unique beam locking structure which allows manual adjustment of the beam and which prevents undesirable movement. The beam locking mechanism includes a cam pin which travels in a cam slot which terminates at one end in a locking slot. The hoist can be partially disassembled for storage by removing leg extensions and hanging them on the upright post.

DESCRIPTION OF THE DRAWINGS

In the accompanying drawings which form a part of the specification and are to be read in conjunction therewith and in which like reference numerals are used to indicate like parts in the various views:

FIG. 4C shows the cam slot arrangement of FIG. 4B in a fully extended and locked position ready for lifting; and, FIG. 5 is a cross-sectional view along lines 5—5 of FIG. 4C.

DESCRIPTION OF A PREFERRED EMBODIMENT

Figure 1:
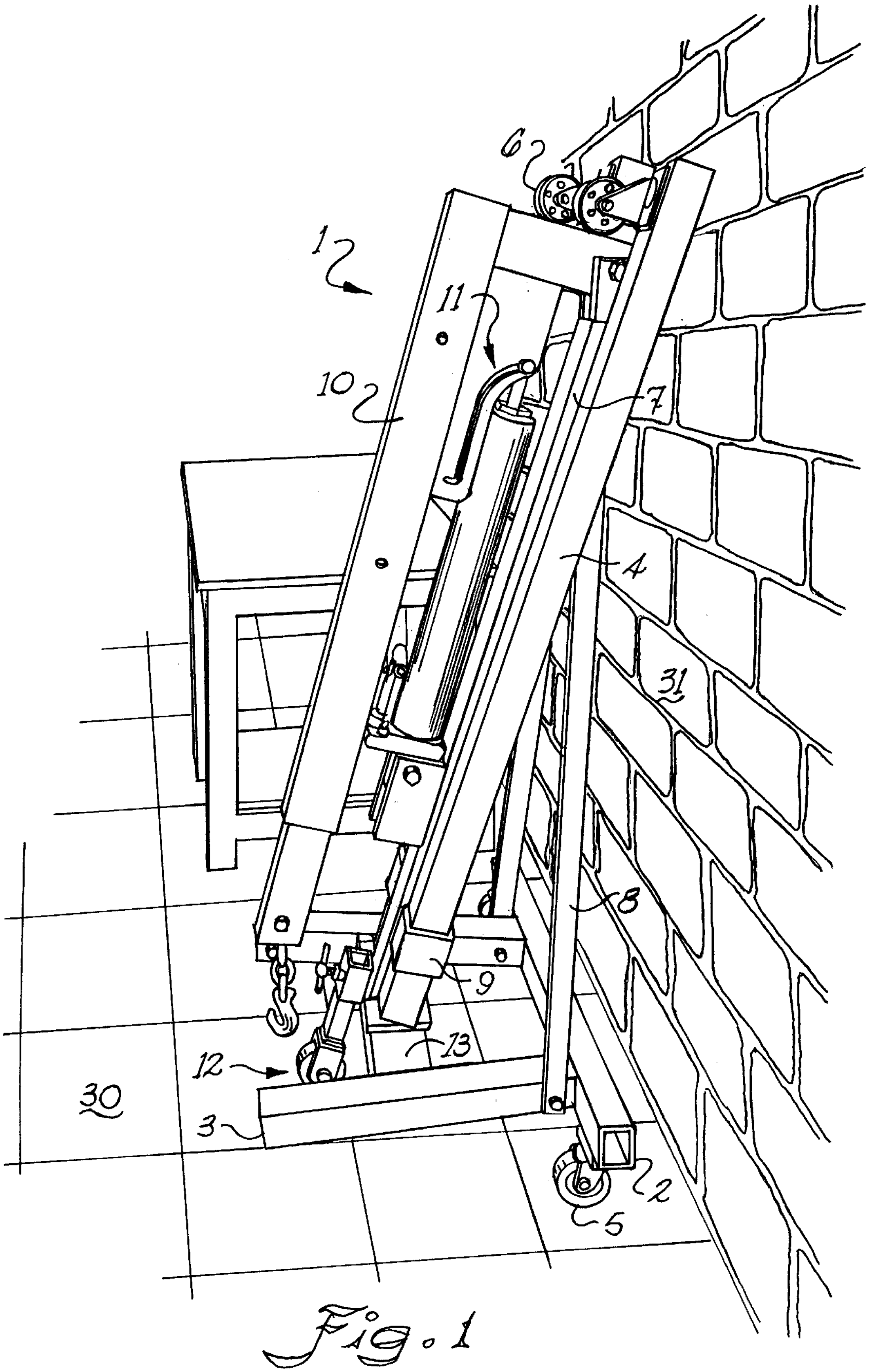
FIG. 1 is a perspective view of the hoist of the present invention in its compactly stored position.

Turning now to FIG. 1, a preferred embodiment and the presently known best mode of the invention is shown in a compactly folded and stored position awaiting use. Base 2 is supported by wheels 5 which are adapted to roll smoothly across garage floors or other support surfaces. Extending from base 2, in the same plane, are base legs 3. Between base legs 3, post support 13 is positioned and the post support carries the upright post 7 which is inclined somewhat from the vertical and is further supported by braces 8. Leg extensions 4 are carried by leg storing means 9 on the post in the compact storage condition. Also shown in this position are the lifting beam 10, the means for manually pivoting beam 11, and the adjusting means for maintaining the height of the base legs 12. As appropriate, all of these parts described above are preferably made from low carbon steel which is either round or channel-like or hollow having a square or rectangular cross-section.

Figure 3:
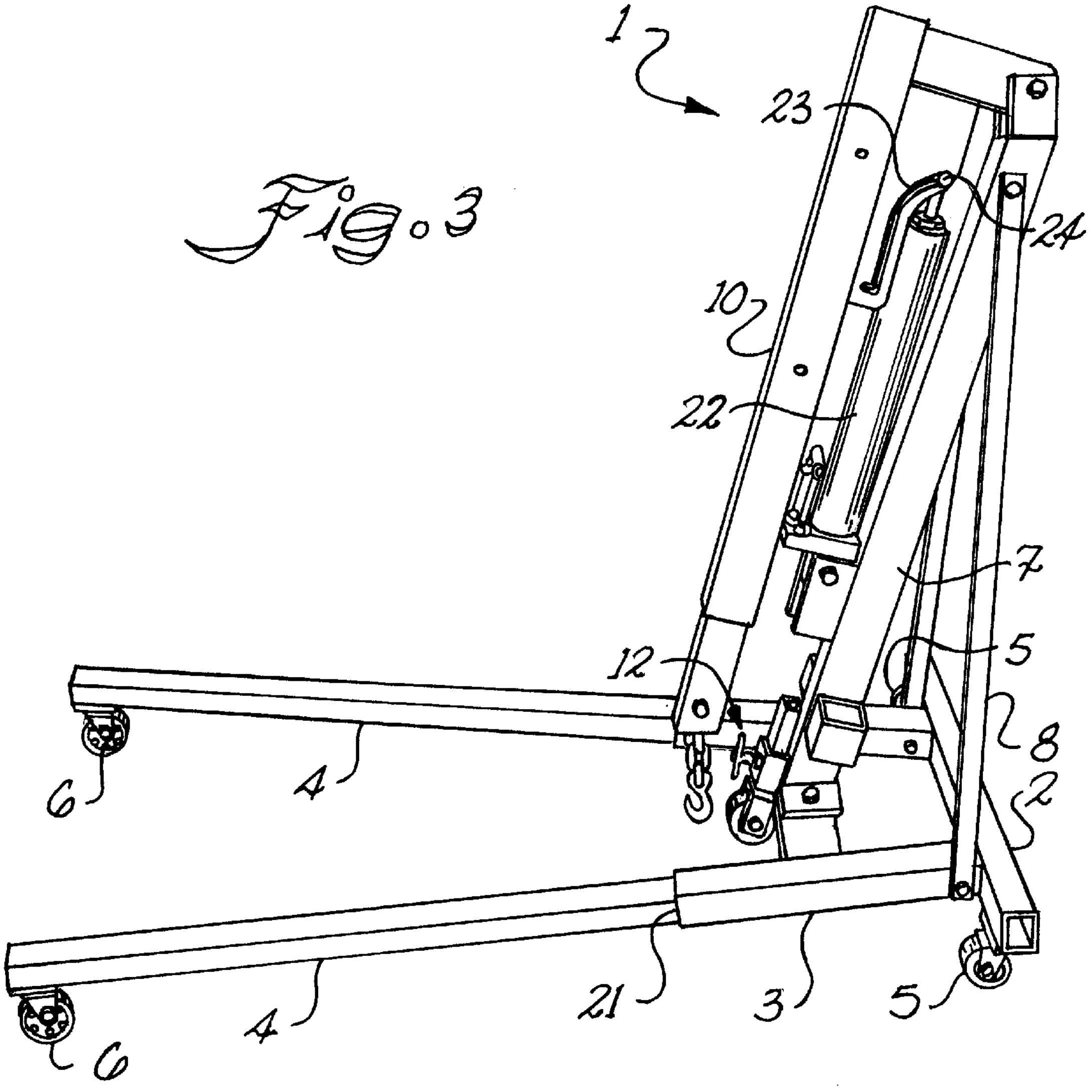
FIG. 3 is a perspective view of the assembled hoist of the invention with the leg extensions in place prior to the lifting beam being moved from its retracted or storage position.

In FIG. 3, the hoist I is shown in the first stage of preparation of use where the leg extensions 4 have been removed from a storage position which is preferably the position on the upright post 7 and inserted into the open and hollow ends of base legs 3. The cross-sectional area of the leg extensions 4 must, of course, be less than the interior cross-sectional area of base legs 3 in order to slide thereinto. In this position the wheel pairs 5 and 6 carry the hoist.

The preparation of the hoist for the position shown in FIG. 3 can be better understood now by reference to FIGS. 1, 2A, 2B, and 3. In FIG. 1 it is seen that the open ends of legs 3 are resting on the floor 30 in the storage position. In FIG. 3 the leg extensions 4 have been removed from their position on the post and inserted into base legs 3, but in order to do so it was first necessary to tilt the hoist and lift the base legs from the floor 30 and position the open end of the base legs so that each base leg is approximately horizontal to the floor 30. To do this in prior art devices requires one person to hold the hoist in a position so that the base legs 4 are horizontal while the extensions are inserted therein. However, one important feature of the present invention is that now one person can accomplish what previously took two people to do as will be described below.

Figure 2A:
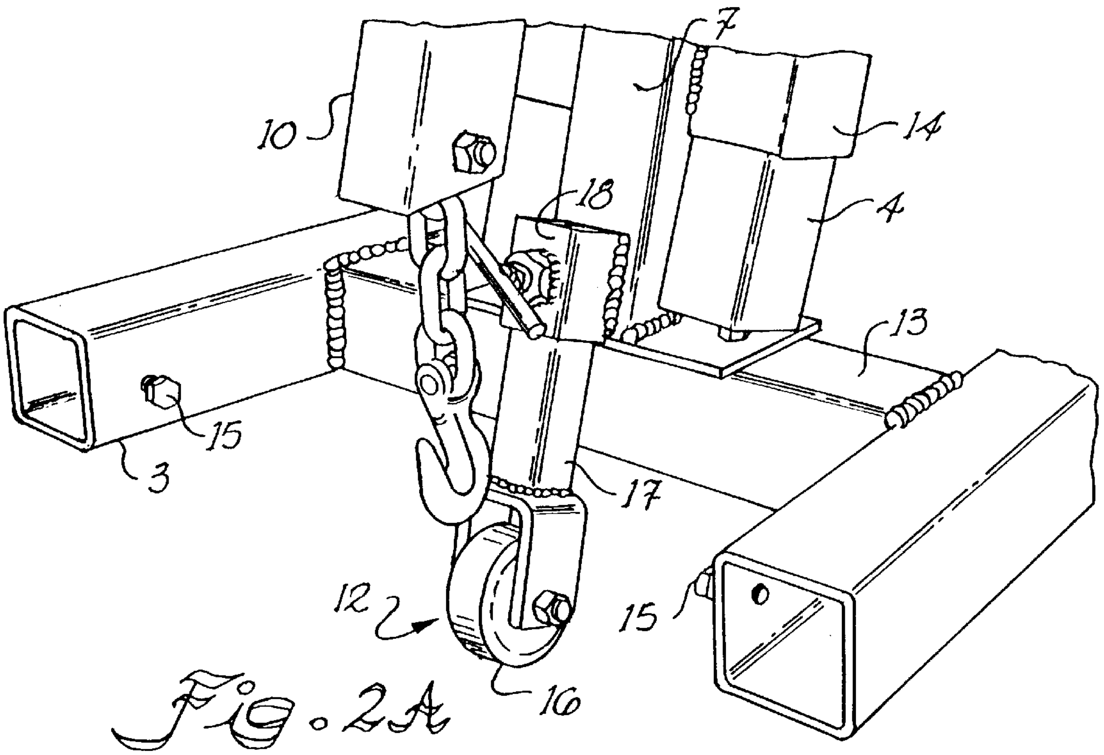
FIG. 2A is a perspective view of one embodiment of the means for adjusting and maintaining the height of the base legs of the hoist of FIG. 1 and in the position shown said means are in the extended position.
Figure 2B:
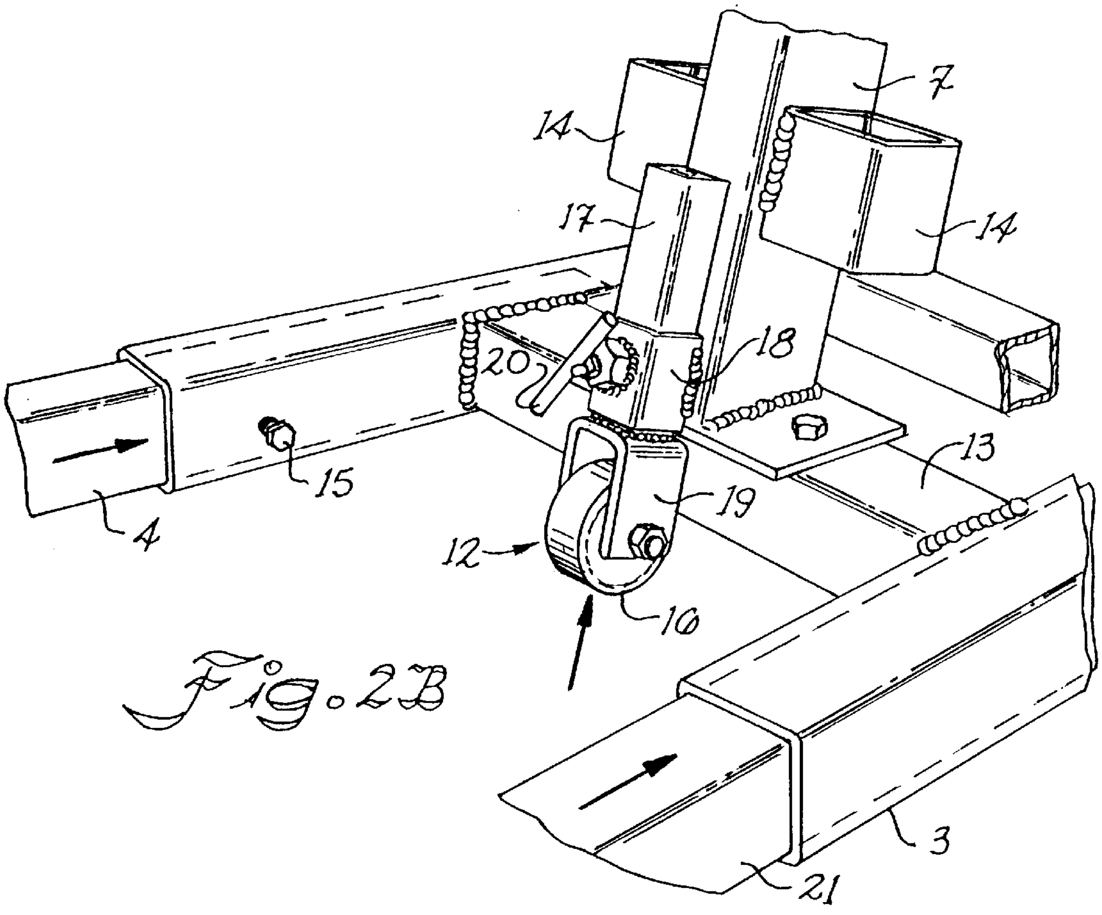
FIG. 2B shows the height adjustment and maintenance means in a retracted position.

Turning to FIGS. 2A and 2B, FIG. 2A represents the support member 12 extended and locked in place with the legs 3 approximately horizontal. This change in position from FIG. 1 to FIG. 2A will be the usual storage position once in position with locking screw 20 holding support shaft 17 within support collar 18. In this position the adjusting wheel 16 cannot move in caster fashion and can roll only in a linear direction.

The wheel 16 which is carried through fork 19 by shaft 17 is free to slide vertically in the unlocked position of screw 20 so that wheel 16 can be manually pulled upwardly once the leg extensions are in place and the locking screw 20 can be turned down tightly so that the wheel 16 remains out of contact with the floor. This is the position shown in FIG. 2B. In FIG. 2B, leg extensions 4 have been removed from the holders 14, inserted into the hollow legs 3, and locked into place by twisting the locking nuts 15. This is all accomplished easily by one person who can, one at a time, remove the extensions and insert them into the legs.

The importance of this feature was mentioned in the discussion under the heading "Background of the Invention" above and may be more readily appreciated with reference to the drawings and to FIG. 3. If wheels are placed near the joint 21 on base legs 3 having the same diameter as wheels 5 and 6 so that extensions 4 can be readily inserted into base legs 3, then there are six wheels on the ground so that the base 2, legs 3, and extensions 4 are all substantially horizontal and lie within the same horizontal plane. The prior art problem is that when under load as in lifting an engine the rearward or base wheels will not always stay on the ground or in the same plane because of the turning moment created around the axis of rotation which is the axis of base leg wheel pair (at connection 21, not shown) because the load created by the weight of the engine is to the left of wheels 6 and a turning moment is transmitted as an upward force through the post and base legs which are to the right of the position of support wheels under joint 21 (wheels not shown). Due to the play between the extensions and the legs because of the sliding fit these wheels contact the floor under load and tend to create a pivot point and lift the wheels 5 off the ground thereby creating an unstable condition. To counteract this in the prior art, particularly, in the design shown in the above referenced Northern Hydraulics Catalog, wheels of smaller diameter are place below the joint so that the pivot point or axis of rotation is eliminated as the wheels do not touch the ground or floor. However, these smaller diameter wheels create the insertion problem mentioned above because, in the stored position as shown in FIG. 1, the smaller diameter wheels will tend to tilt the opening of the base legs 3 downwardly.

The adjusting means of the present invention has surprisingly overcome the above described problem and, when ready for use, the wheel 12 of FIG. 2A and 2B is pulled upwardly and locked into place with screw 20 so that it does not contact the ground and provide an unwanted axis of rotation or pivot point when the hoist is under load. This withdrawn position is shown in FIG. 2B. The result is a completely stable position with four wheels, namely, the pairs 5 and 6 on the floor and all four wheels are rigidly connected through all the support members so that any play will not create unwanted rotational points. It should be understood that the adjusting means may be operably affixed to the base, to the post, to the legs, or to any two or all three of these members.

Figure 2C:
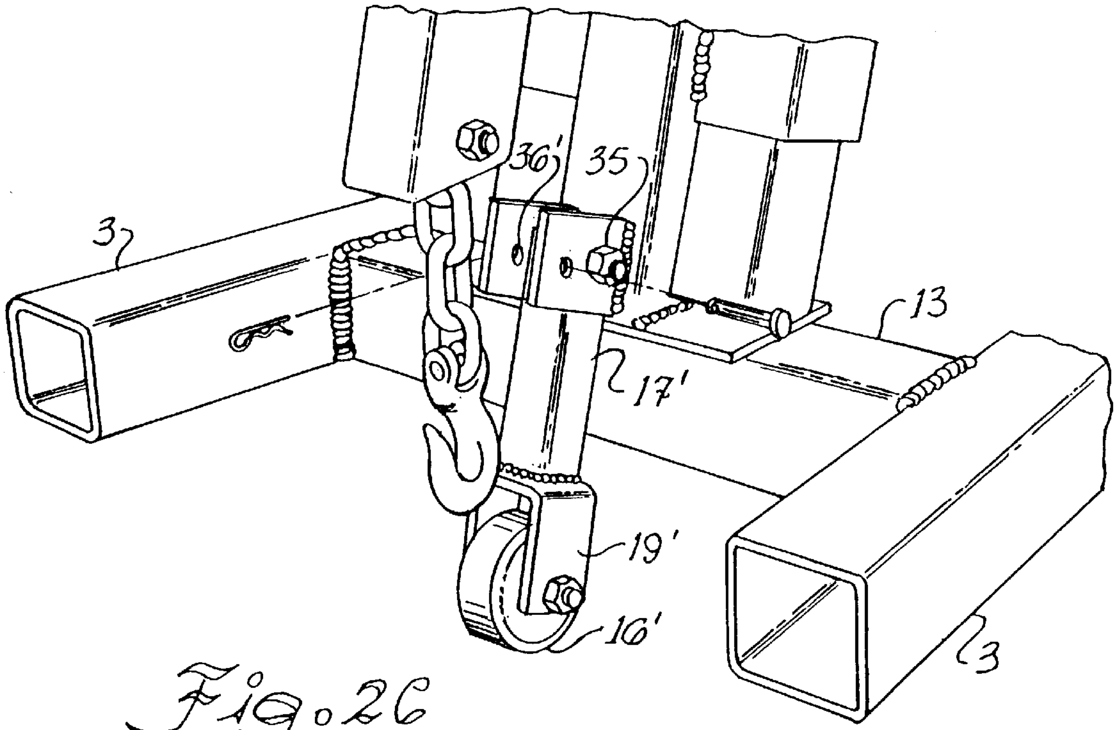
FIG. 2C is a perspective view of an alternate embodiment of a means for adjusting and maintaining the height of the base legs.
Figure 2D:
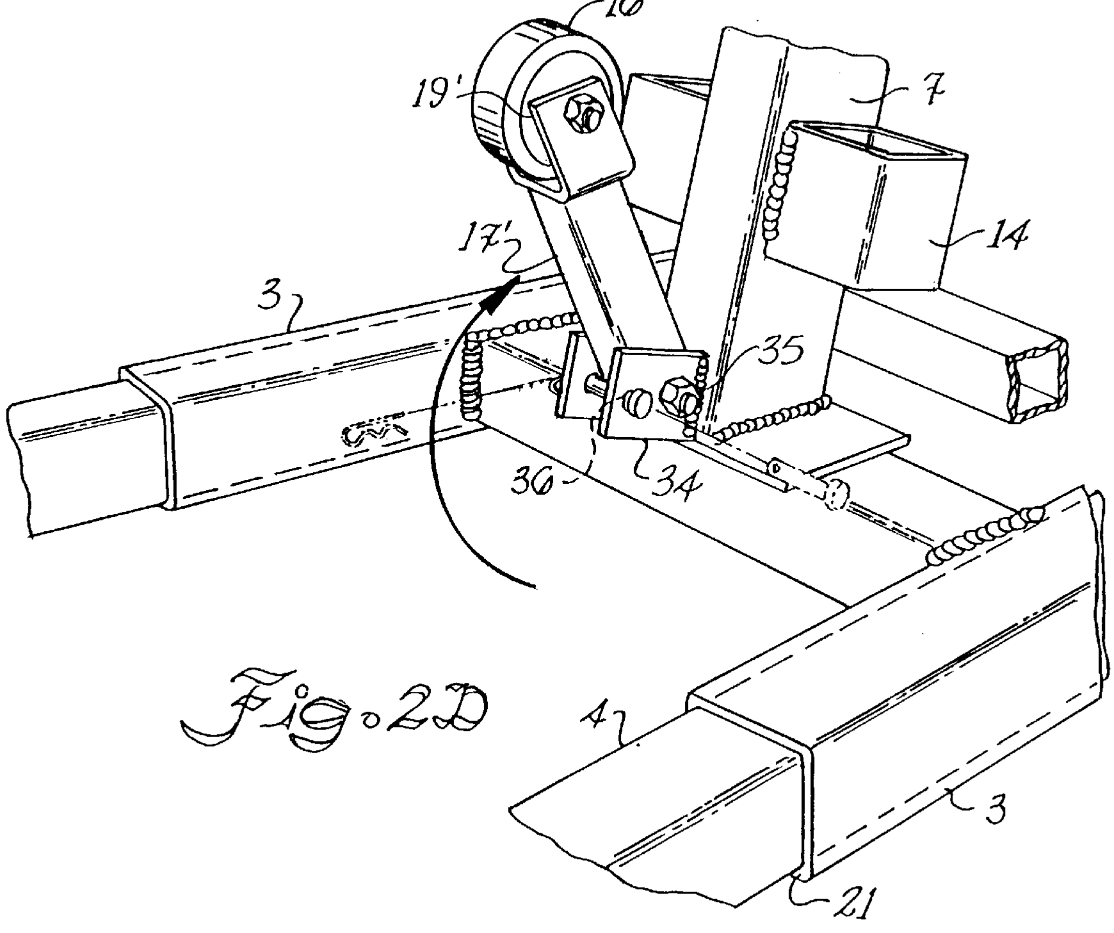
FIG. 2D is the view of FIG. 2C showing the alternate embodiment in a retracted position.

An alternate embodiment of the adjusting and maintenance member is shown in FIGS. 2C and 2D. In FIG. 2C wheel 16' is mounted through an axle in fork 19' that is carried by support shaft 17'. The shaft 17' is mounted at pivot 35 and held by pivot lockpin 36 in U-shaped channel support 34 which is attached to post 7. When in the "down" or support position, as in FIG. 2C, the wheel 16' will keep the legs 3' in a horizontal position. When the extensions 4 are in place as in FIG. 2D lockpin 36 can be removed and the wheel 16' pivoted upwardly where lockpin 36 can be reinserted to hold shaft 17' away from the floor so that wheel 16' cannot perform any support function that would cause hoist instability.

Figure 4A:
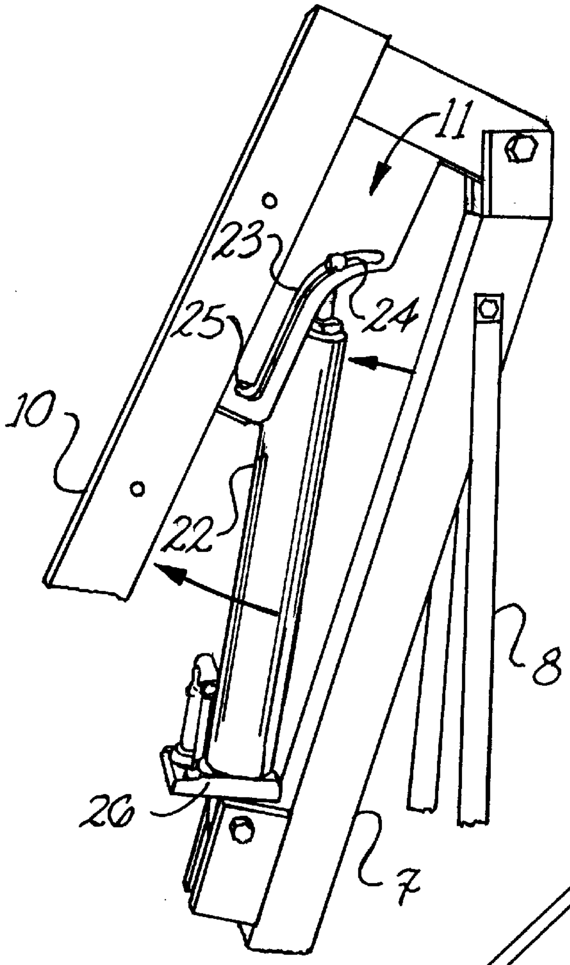
FIG. 4A shows the manual beam lifting and positioning means which includes the cam slot and pin arrangement of the present invention in the folded or storage position before the lifting beam is manually moved.
Figure 4B:
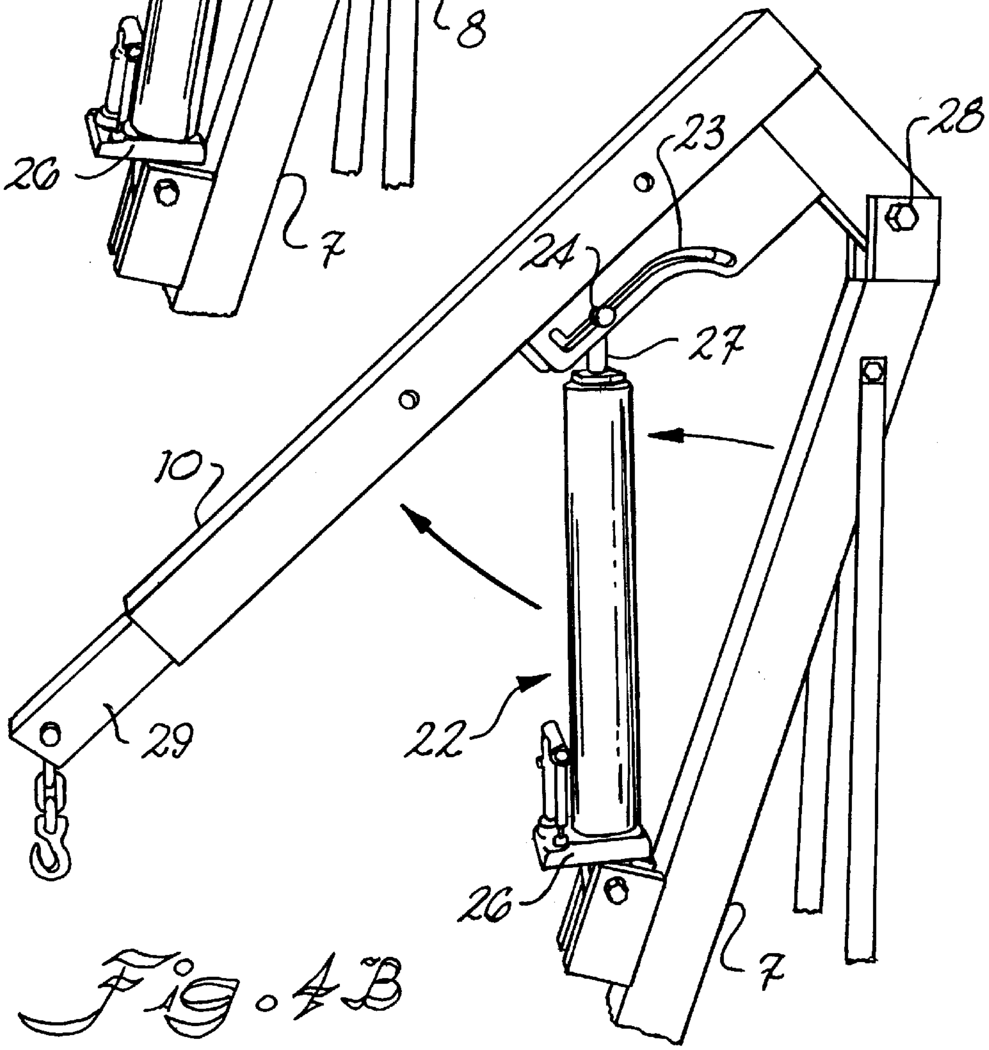
FIG. 4B shows the arrangement of FIG. 4A in a partially extended position.

Another important feature of the present invention can be seen by viewing FIGS. 4A, 4B, and 4C. In the prior art it took quite a number of pumps or strokes of a hydraulic jack or turns of a mechanical jack, if such is used, to raise the lifting beam to the position where it was actually ready to hoist the engine. In other words, quite a number of jack strokes were required to move lifting beam 10 from the position shown in FIG. 4A to the position shown in FIG. 4C. In these figures jack 22 is shown which preferably may be a hydraulic or pneumatic jack but can be a mechanical jack. The connecting or drive rod 27 of the jack is attached to cam pin 24 which travels in cam slot 23 that terminates as shown in the drawings in a locking slot 25. This comprises the means 11 for moving and adjusting the lifting beam 10. The body 32 having the cam slot formed therein is fixed to the beam 10 which is pivotally mounted on upright post 7 through pivot 28.

In an alternate embodiment (not shown) the cam slot body 32 may be positioned on the upright post 7 and the jack 23 may be connected at its end opposite the drive rod to the lifting beam 10. This, in effect, reverses the position of the jack and, for some designs, may provide a very suitable locking arrangement.

In operation, when the engine hoist has been rolled to the location where an engine is to be removed the jack 22 will be in the position shown in FIG. 4A. The jack comprises connecting or drive rod 27 and base or cylinder 26. By manual lifting, the beam can be raised through the intermediate position shown in 4B to the locked position in FIG. 4C where the pin 24 is firmly located in locking slot 25. At this point the beam extension 29 (FIG. 4B) can be readily extended so that the carrying hook 37 will be positioned over the engine at the optimum point. Manual adjustment is the quickest and most reliable way of doing this. It is particularly advantageous that the pin 24 is in locking slot before the lifting force is applied from the jack 22. This feature of the invention provides a safe and positive way of lifting an engine.

In FIG. 5, a cross-section of the lifting beam 10 from FIG. 4C is shown looking along lines 5—5. The beam extension 29 is shown as it fits inside the hollow beam 10. The extension is held in place by locking nuts 33. FIG. 5 gives the transverse view of the pin 24 set within the cam slot of body 32.

The foregoing describes the preferred and the presently known best mode of my invention. However, it is to be understood that the present invention is not limited to the embodiments described above but encompasses any and all other embodiments within the scope of the following claims:

What is claimed is:

1. A compactly storable, mobile engine hoist comprising:

a) a base having means for rolling support on a surface, said base having two outwardly extending, spaced apart base legs each having an outer end adapted for connecting with a leg extension;

b) leg extensions movable from a storage position to a supporting position, each of said extensions having means at one end thereof for rolling support on a surface in the supporting position of the leg extension, and each extension being adapted for supporting connection with a base leg;

c) a post support carried by said base;

d) an upright post extending from said post support;

e) a lifting beam pivotally connected to said post; and, f) a leg height adjusting wheel carried by said base having a supporting position engaging said surface so that said legs are maintained at the proper height to readily receive said extensions, and a retracted position whereby said wheel is out of contact with said surface for operation of said hoist.

2. The engine hoist of claim 1, wherein said means for pivoting said beam comprises:

a) an extensible and retractable adjustable jack mechanism having a base end and a drive rod at a rod end, said rod having a cam pin associated therewith;

b) a body having a cam slot formed therein, said body being associated with said beam, said slot being adapted to receive said cam pin so that said pin may travel therein as said beam is raised and lowered; and, c) a locking slot at one end of said cam slot to receive said cam pin at the fully raised position of said beam and lock for operation of said hoist.

3. The engine hoist of claim 2 wherein said jack is selected from the group consisting of mechanical, pneumatic, and hydraulic jacks.

4. The engine hoist of claim 1 wherein said legs have outwardly facing openings at their ends opposite said base, said leg extensions having outer dimensions smaller than corresponding inner dimensions of said openings whereby one of said extensions may be slidably inserted into one of said openings in the supporting position; and, said post has storage means associated therewith for storing said extensions when moved from a supporting position.

5. The engine hoist of claim 1 wherein said leg height adjusting wheel includes an adjustable fork for carrying said wheel.

6. The engine hoist of claim 5 wherein said fork includes a shaft slidably mounted in a collar affixed to said base.

7. The engine hoist of claim 6 including a lock for locking said shaft when in said support position or in said retracted position.

8. The engine hoist of claim 5 wherein said adjusting wheel is fixed for rolling movement in a linear direction.

9. The engine hoist of claim 5 wherein said adjustable fork is pivotally mounted whereby said fork can be rotated thereby rotating said wheel out of contact with the support surfaces in to a retracted position.

10. A compactly storable, mobile engine hoist comprising:

a) a base having two spaced apart legs and means for movement along a support surface;

b) leg extensions movable from a support position to a storage position each extension having spaced apart connecting and supporting ends, each supporting end having means for rolling movement along a surface associated therewith;

c) a post support carried by said base;

d) an upright post extending from said post support;

e) a lifting beam pivotally connected to said post and having means for locking said jack in a lifting position associated therewith;

f) a jack carried by said post, said jack being movable from a storage position to a lifting position; and, g) a leg height adjusting member for maintaining said legs in a supporting position so that said extensions may be connected to said legs, said adjusting member being retractable when said extensions are in a supporting position for hoist operation.

11. The engine hoist of claim 10 wherein the leg height adjusting member includes pivotally mounted, retractable wheel means.

12. A compactly storable, mobile engine hoist comprising:

a) a base having means for rolling movement along a support surface;

b) spaced apart base legs extending from said base;

c) a post support carried by said base;

d) a height leg adjusting member for placing said legs in a position horizontal to and spaced apart from said surface;

e) leg extensions which are connectable to said base legs;

f) an upright post extending upwardly from said post support;

g) a lifting beam pivotally connected with said post;

h) a jack pivotally mounted between said beam and said post for raising and lowering said beam, said jack having a drive rod and cam pin associated therewith; and, i) a cam slot disposed for receiving said pin, one end of said slot being provided with a locking slot to hold the cam pin in place under load and prevent undesired movement of said beam.

13. In a compactly storable horizontally movable, engine hoist having two base legs, leg extensions, and an upright post for carrying a lifting beam, the improvement which comprises a retractable adjusting member for positioning said base legs for proper height during removal and connection of said leg extensions, said adjusting member being positioned between said legs.

14. The engine hoist of claim 13 wherein the member for positioning said legs includes a retractable wheel positioned for linear rolling support.

15. In a compactly storable engine hoist having base legs, leg extensions, and an upright post for carrying a lifting beam, and a jack having a drive rod, the improvement wherein said jack is connected between said post and said beam for lifting said beam from a storage position to an operating position, said improvement further comprising:

a) a cam body positioned on said lifting beam;

b) a cam slot formed in said body and a cam follower carried by said drive rod of said jack, said follower being positioned in said slot;

c) said cam follower having a first position in said cam slot when said beam is folded and a second position for lifting.

16. The improved engine hoist of claim 15 wherein said cam body of subparagraph (a) is positioned on said post.

17. The engine hoist of claim 15 including a locking slot at one end of said cam slot.

* * * * *